(No Model.) 6 Sheets—Sheet 1.

J. M. NASH.
BORING, SHAPING, AND SAWING MACHINE.

No. 355,550. Patented Jan. 4, 1887.

Witnesses:
Inventor:
John M. Nash
By Stout & Underwood
Attorneys.

(No Model.)  6 Sheets—Sheet 2.

J. M. NASH.
BORING, SHAPING, AND SAWING MACHINE.

No. 355,550.  Patented Jan. 4, 1887.

(No Model.) 6 Sheets—Sheet 3.
J. M. NASH.
BORING, SHAPING, AND SAWING MACHINE.
No. 355,550. Patented Jan. 4, 1887.

(No Model.) 6 Sheets—Sheet 4.
J. M. NASH.
BORING, SHAPING, AND SAWING MACHINE.
No. 355,550. Patented Jan. 4, 1887.

(No Model.) 6 Sheets—Sheet 5.
J. M. NASH.
BORING, SHAPING, AND SAWING MACHINE.
No. 355,550. Patented Jan. 4, 1887.
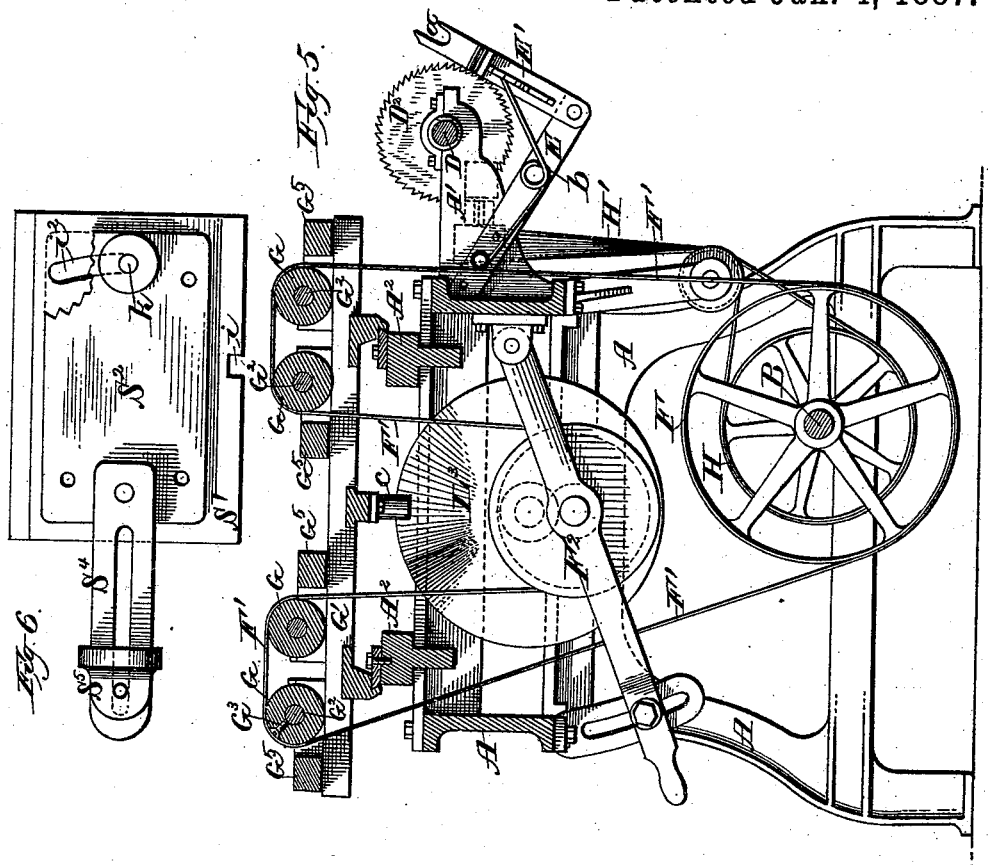
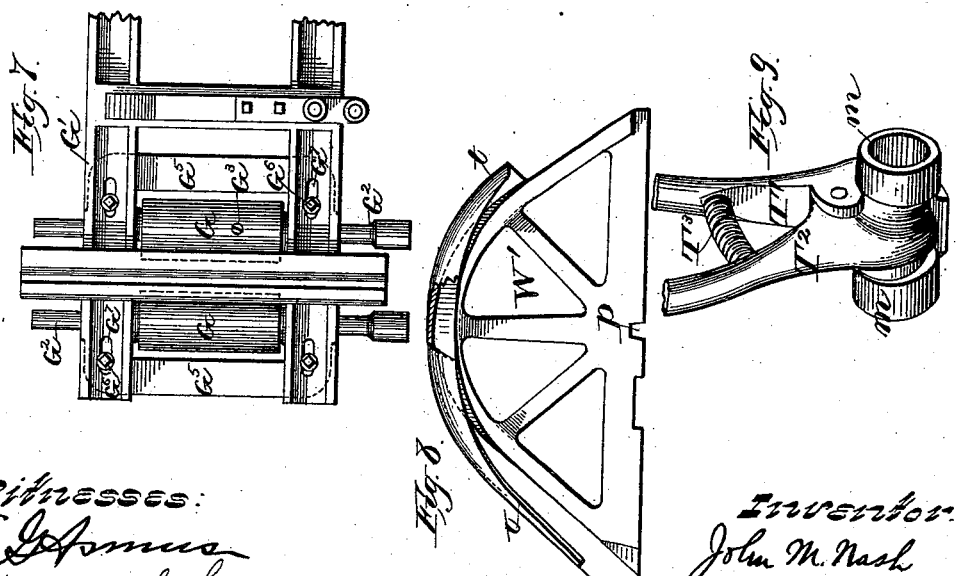
Witnesses:
E. J. Somus
Maurice F. Frear
Inventor:
John M. Nash
By Stunt & Underwood
Attorneys.

(No Model.) 6 Sheets—Sheet 6.
J. M. NASH.
BORING, SHAPING, AND SAWING MACHINE.
No. 355,550. Patented Jan. 4, 1887.
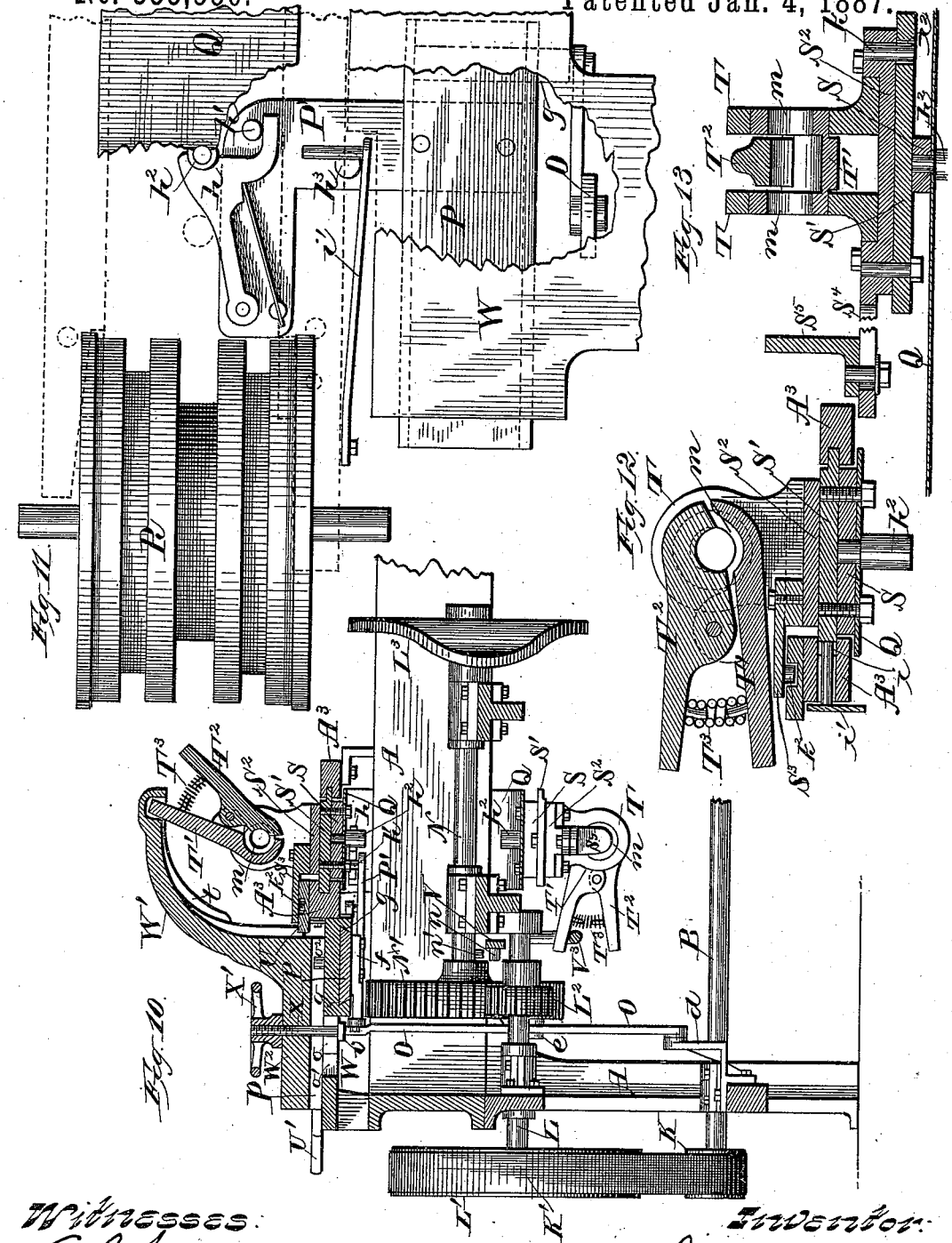
Witnesses:
E. G. Asmus
Maurice F. Frear.
Inventor:
John M. Nash
By Stout & Underwood
Attorneys
N. PETERS. Photo-Lithographer, Washington, D. C.

UNITED STATES PATENT OFFICE.

JOHN M. NASH, OF HUDSON, ASSIGNOR TO DAVID JENKINS, OF SHEBOYGAN, WISCONSIN.

BORING, SHAPING, AND SAWING MACHINE.

SPECIFICATION forming part of Letters Patent No. 355,550, dated January 4, 1887.

Application filed June 1, 1886. Serial No. 203,707. (No model.)

*To all whom it may concern:*

Be it known that I, JOHN M. NASH, of Hudson, in the county of St. Croix, and in the State of Wisconsin, have invented certain new and useful Improvements in Boring, Shaping, and Sawing Machines; and I do hereby declare that the following is a full, clear, and exact description thereof.

My invention relates to universal joiners; and it consists in certain peculiarities of construction, whereby I accomplish a saving of time and expense in the manufacture of chair-legs, as will be hereinafter described with reference to the accompanying drawings, in which—

Figure 1:
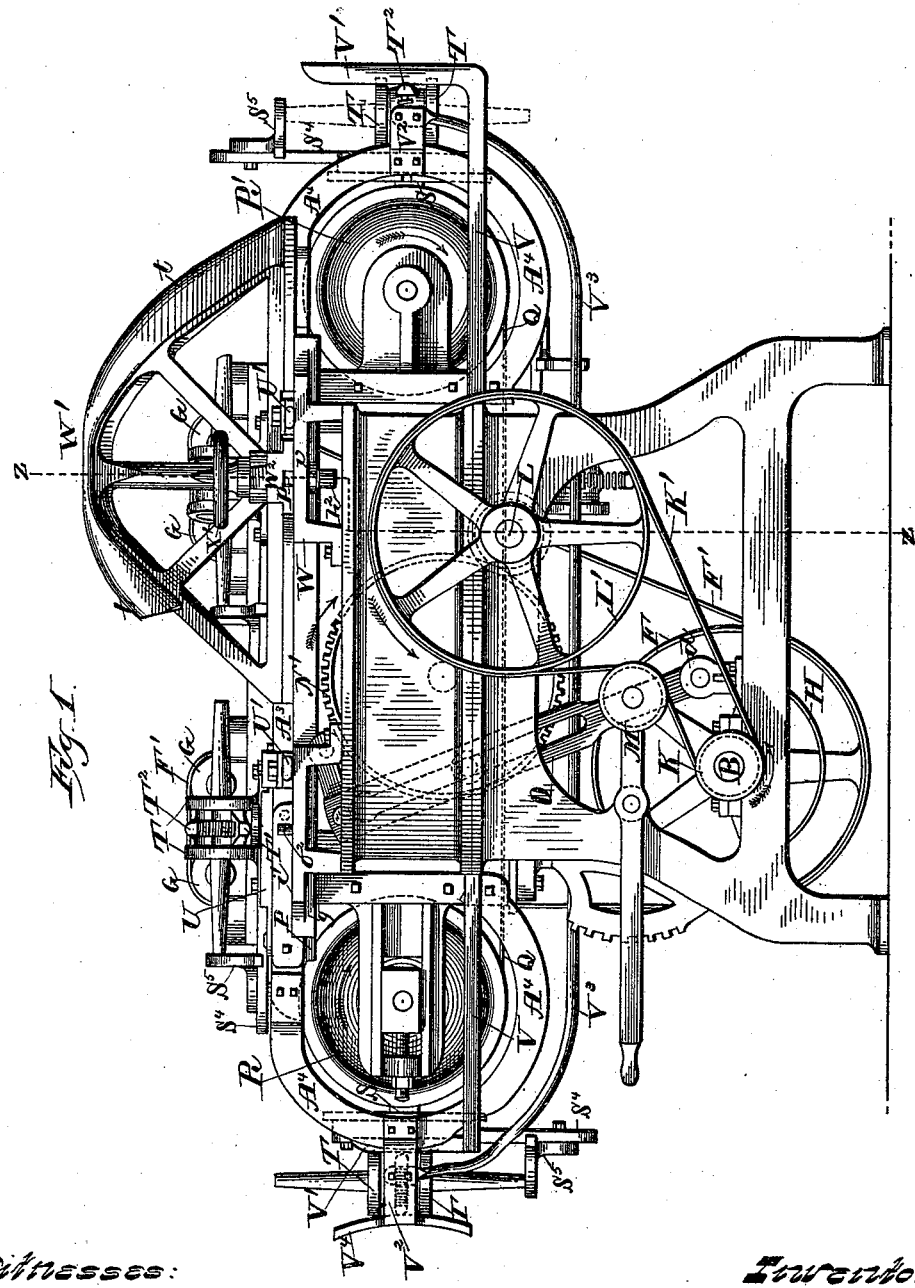
Figure 2:
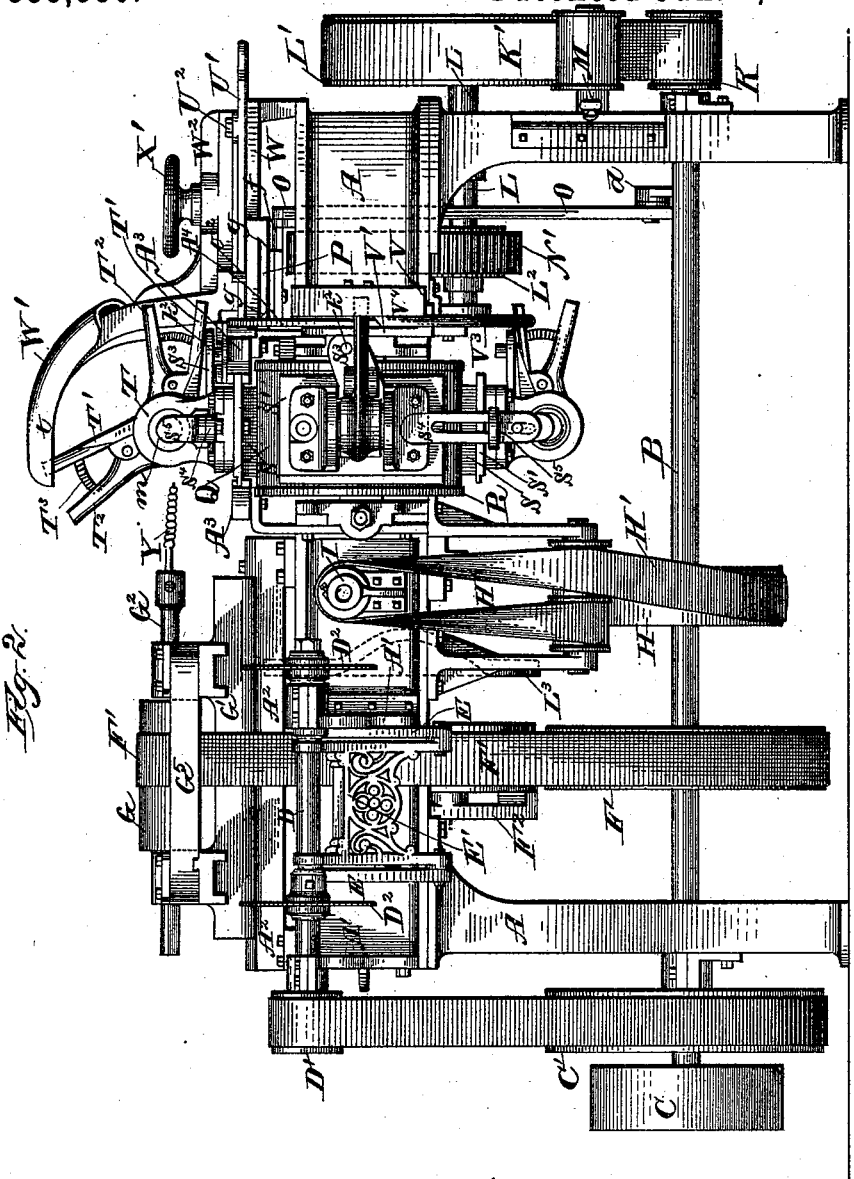
Figure 3:
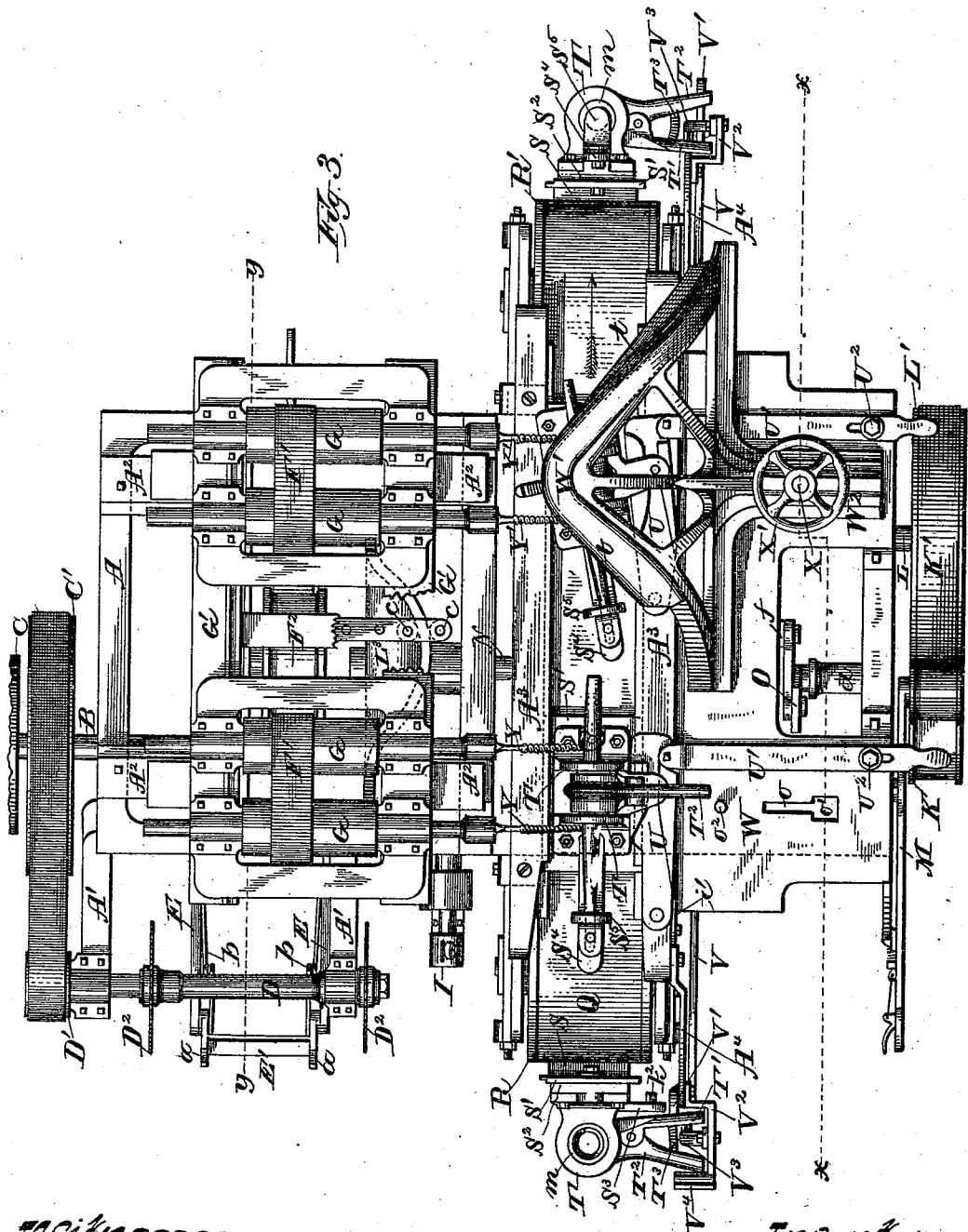
Figure 4:
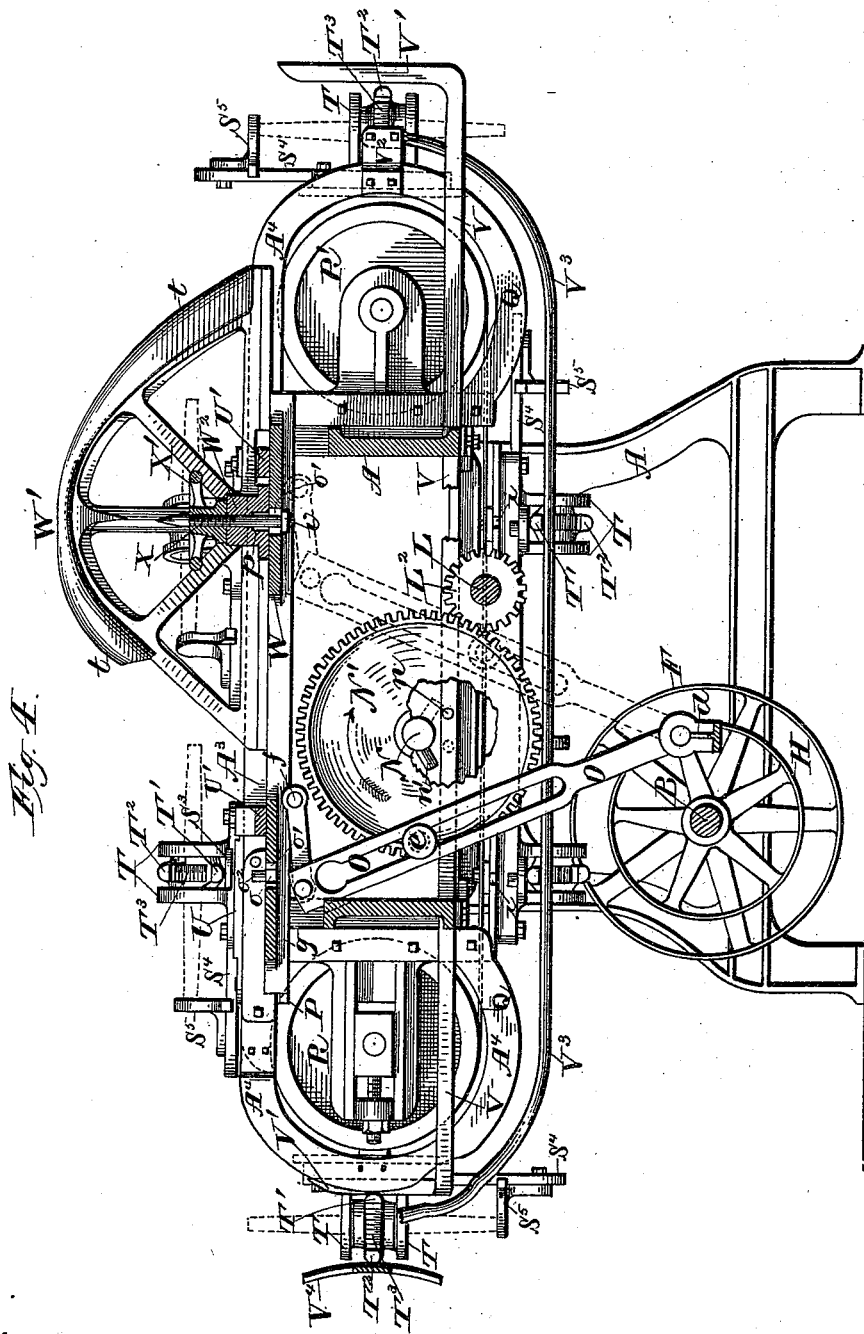

Figure 1 represents an elevation of that side of my machine farthest from the driving-pulley; Fig. 2, an elevation of the feed end; Fig. 3, a top plan view; Fig. 4, a vertical cross-section on line $x\,x$, Fig. 3; Fig. 5, a similar view on line $y\,y$, Fig. 3; Fig. 6, a detail view of a clutch-head; Fig. 7, a partial under side view of the boring-frame; Fig. 8, a front elevation of the adjustable cam-head; Fig. 9, a perspective detail of one of the clutches; Fig. 10, a partial transverse section on line $z\,z$, Fig. 1; Fig. 11, a detail view showing one of the drums, a portion of the endless traveler, and the operating mechanism for the latter; Fig. 12, a vertical transverse section of one of the clutches, and Fig. 13 a vertical longitudinal section of the same.

Referring by letter to the drawings, A represents the main frame of my machine, and B the main shaft, having keyed thereto driving-pulleys C C'. Extended out from the frame A at the feed end of the machine are brackets A,' that form bearings for a shaft, D, provided with a pulley, D', having a belt-connection with the one, C', on the main shaft, said shaft also having adjustably secured thereto circular saws $D^2$. Suitably secured to the feed end of the frame A are arms E, having pivotally connected thereto a rack, E', provided at its upper ends with seats $a$, to receive the chair-legs that are forced up against the saws $D^2$ to be cut the proper length, a spring, $b$, being operatively united to said arms and rack, to automatically bring the latter back to its normal position on being released from pressure by the operator.

Keyed to the main shaft B is a pulley, F, that has a belt-connection, F', with spindles G, that are journaled in a sliding frame, G', operative on suitable guides, $A^2$, secured to the frame A, a tightener, $F^2$, for this belt-connection being pivotally united to said frame, as illustrated in Fig. 5. The main shaft B also carries a pulley, H, that has a belt-connection, H', with a hollow auger, I, operatively secured to the feed end of the machine, and serving to reduce the upper portion of each chair-leg after the latter has been operated upon by the saws $D^2$, this reduction being necessary for the purpose of properly fitting said legs in the sockets formed in chair-seats.

At that end of the main shaft B farthest from the driving-pulley is keyed a pulley, K, having a belt-connection, K', with another pulley, L', on a short shaft, L, that has its bearings in the frame A, said belt being provided with a tightener, M, that is pivotally connected to said frame.

The shaft L is provided with a pinion, $L^2$, that meshes with a gear-wheel, N', keyed to one end of a central shaft, N, that has its bearings in the frame A; and keyed to the other end of this shaft is a cam-wheel, $L^3$, that operates between friction-rollers $c$, pendent from the spindle-frame $G'$; thus causing the latter to slide back and forth upon its guides $A^2$ at the proper time.

Pivotally connected to a bracket, $d$, on the main frame A is a link-arm, O, that engages a pin, $e$, on the gear-wheel N', said arm also being pivotally connected to another arm, $f$, that is in turn pivoted to a sliding plate, P, operative in guides $g$, and provided with an angle-piece, P', that extends beneath the upper portion of an endless traveler, Q, and has connected thereto a spring-latch, $h$, and a stop, $h'$, designed to limit the movement of said latch toward the drive side of the machine. The endless traveler Q operates on drums R R', that are secured to the respective feed and delivery ends of the machine, the one R being adjustable, so that the tension of said traveler may be regulated.

At suitable intervals on the outer face of the traveler Q are secured transverse seats S, that have fast thereon plates S', designed to be operative in guides $A^3$ on the frame A as said traveler is rotated, each of these plates being provided with a notch, $i$, adapted to engage a spring-catch, $i'$, that is thrown out of engagement at the proper time by the action of a pin, $h^3$, on the angle-piece P', secured to the sliding plate P, thereby leaving the said part Q free to travel. The rotation of the traveler Q is caused by the engagement of the spring-latch $h$ on the angle-piece P' of the plate P, with lugs $h^2$ vertically extended from the clutch-seats S and passing through the part Q. The plate P being moved forward by the action of the gear-wheel N', the latch $h$ being in contact with one of the lugs $h^2$, forces the part Q to travel in the same direction until this plate has reached its limit, when the latter is carried back to cause an engagement with another of said lugs, and at the same time to bring the pin $h^3$ into action against the spring-catch $i'$ to release the catch, that has up to this time been engaged with the plate S', as above described.

Each of the plates S' has pivotally connected thereto another plate, $S^2$, the latter being provided with a depending pin, $k$, that operates in a curved slot, $i^2$, of the corresponding part, S', thereby limiting the movement of said plate $S^2$. Suitably secured to the several plates $S^2$ are standards T, designed to receive the trunnions $m$ of a clutch-arm, T', this latter having pivotally connected thereto another clutch-arm, $T^2$, a spring, $T^3$, being interposed between these arms to cause an automatic return of the one $T^2$ to its normal position after having been acted upon, as will be hereinafter described.

Laterally projected from each of the plates $S^2$ is an extension, $S^3$, provided with a depending pin, $k^2$, that engages a grooved plate, U, pivoted to one of the guides $A^3$ at each end of the machine, and capable of adjustment by means of horizontal slide-bars U', retained in their adjusted position by means of binding-screws $U^2$. The plates $S^2$ are also severally provided with a slotted longitudinal extension, $S^4$, that has adjustably connected thereto a set-block, $S^5$.

Operative in suitable bearings on the frame A is a longitudinal bar, V, having right-angular upwardly-extended ends V', and this bar is provided with a lateral lug, $n$, that is acted upon by a wiper, $n'$, projecting from the shaft N.

Secured to brackets $A^4$ at each end of the frame A are brackets $V^2$, united by a rod, $V^3$, that forms a lower guide, on which travels the clutch-arms T during the operation of the machine, the bracket at the feed end of the machine having a vertical head, $V^4$.

To the top of the frame A farthest from the drive side of the machine is secured a double bed-plate, W, on which rest the sliding bars U', and adapted to be adjustably connected to either section of said plate is a cam-head, W'. Each section of the bed-plate W is provided with a slot, $o$, having an enlargement, $o'$, and in line with said slot is a lug, $o^2$, that is designed to engage a groove, $p$, in the horizontal arm $W^2$ of the cam-head W'; the latter being secured to either section of said bed-plate, as may be convenient or desirable.

A pin, X, is passed through a corresponding perforation in the horizontal arm of the cam-head and enters a binding-screw, X'. This pin has a square head, $v$, that readily passes through the enlarged portion of the slot $o$ and bears against the under side of the bed-plate. When the cam-head is drawn back out of engagement with the lug $o^2$, it can be pivotally adjusted so as to stand at an angle to the bed-plate.

In the operation of my invention, after the chair-legs have been acted upon by the saws $D^2$ and hollow auger I, they are fed to the clutches on the traveler Q, the blocks $S^5$ on the extensions $S^4$ of the clutch-plates $S^2$ being suitably adjusted according to the length of said chair-legs. As the clutches are carried around, their lateral extensions $S^3$ come into engagement with the grooved plates U, and the notches $i$ in the plates S' are successively engaged by the spring-catches $i'$. By this time the sliding plate P is on its return movement, and the traveler, in consequence thereof, is stationary, thereby holding the chair-legs in position to be acted upon by bits Y Y', secured to the spindles G, thereby forming the sockets for the rounds, the cam-wheel $L^3$ being so timed that the sliding frame G', carrying said spindles, is brought into immediate action the moment said return movement of the sliding plate begins. The chair-leg in the clutch nearest the feed end of the machine is bored out on one side by the action of the adjacent bits Y, and when carried along by the action of the traveler is turned over to be acted upon by the other set of bits, Y', that bore out sockets at right angles to those first formed. This turning over of the chair-legs is automatically accomplished by the clutch-arm T' riding on the cam-head W', the latter having a guard-flange, $t$, that limits the movement of the clutch in a direction toward the drive side of the machine. After the first chair-leg fed to the machine has been acted upon by the bits Y and passed on to come in position for boring by the bits Y', the action thereafter of both sets of said bits is simultaneous on two of such legs, each of the latter being successively turned over, as above described. When the bits Y' have finished their work, the chair-leg acted on thereby is moved on by the action of the traveler to the delivery end of the machine, and the clutch-arm $T^2$ comes in contact with one of the upward-extended ends V' of the longitudinal bar V. The lug $n$ on the bar V is now in engagement with the wiper $n'$, projecting from the shaft N, and thus said bar is carried back toward the feed end of the machine, thereby pressing on the clutch-arm $T^2$ and releasing the chair-leg that has been acted upon by the bits Y'. By this action of the bar V the arm $T^2$ of the clutch, coming into operation at the feed end of the machine, is forced against the vertical head $V^4$ on the bracket V² at this point, thereby automatically opening this latter clutch to permit the introduction of an unbored chair-leg. After the wiper n' has passed out of contact with the lug n on the bar V, the force of the spring T³, uniting the clutch-arms, will cause said bar to return to its normal position, ready for another actuation.

By having the plates U and the cam-head W' pivotally connected to their supports, they may be so adjusted as to cause the clutch-heads to assume an angle to the line of travel of the part Q, and this being done, the sockets bored in the chair-legs by the bits Y Y' will be at a corresponding angle, it being usual to thus bore said sockets. The shafts G² of the bit-spindles may be horizontally adjusted, so as to regulate the depth of the bored sockets, each of said shafts being retained in its adjusted position by a set-screw, G³, as illustrated in Fig. 7.

The bearings G⁵ for the shafts G² are provided with depending bolts G⁶, that operate in longitudinal slots G⁷ in the frame G', their heads bearing against the under side of said frame, this construction serving to allow an adjustment whereby the distance apart of the bored sockets may be regulated.

Having thus fully described my invention, what I claim as new, and desire to secure by Letters Patent, is—

1. A main frame having journaled thereto a drive-shaft that carries a system of belt-pulleys, a sliding frame operative on the main one and carrying a series of revolving bit-spindles, an endless traveler operative on suitable drums at right angles to the sliding frame, and provided with a series of pivoted plates arranged at intervals thereon, pivotally united clutch-arms trunnioned to the plates, and means for intermittingly operating said sliding frame and traveler and for automatically adjusting the clutches, substantially as set forth.

2. A main frame having journaled thereto a drive-shaft that carries a system of belt-pulleys, brackets extended from the main frame at the feed end of the machine, a shaft journaled in the brackets and carrying circular saws, an endless traveler operative on suitable drums and provided with a series of pivoted plates arranged at intervals thereon, pivotally-united clutch-arms trunnioned to the plates, a boring mechanism carried by a sliding frame arranged on the main one at right angles to the traveler, and means for intermittingly operating said traveler and sliding frame and for automatically adjusting the clutches, substantially as set forth.

3. A main frame having journaled thereto a drive-shaft provided with a system of belt-pulleys, brackets extended from the main frame at the feed end of the machine, a shaft journaled in the brackets and carrying circular saws, a hollow auger operatively connected to said end of the machine adjacent to the saws, an endless traveler operative on suitable drums and provided with a series of pivoted plates arranged at intervals thereon, pivotally-united clutch-arms trunnioned to the plates, a boring mechanism carried by a sliding frame arranged on the main one at right angles to the traveler, and means for intermittingly operating said sliding frame and traveler and for automatically adjusting the clutches, substantially as set forth.

4. The main frame having journaled thereto a drive-shaft that carries a system of belt-pulleys, an intermittingly-operated sliding frame carrying a series of revolving spindles, and an intermittent traveler provided with a series of clutches, each clutch comprising a stationary part secured to a seat on the traveler, a plate pivotally adjustable on the stationary part and having lateral and longitudinal extensions, the latter extension being provided with an adjustable set-block, standards secured to the pivoted plate, and pivotally-united clutch-arms having an interposed spring, one of said arms being provided with trunnions designed to operate in the standards, substantially as set forth.

5. The main frame having journaled thereto a drive-shaft that carries a system of belt-pulleys, an intermittingly-operated sliding frame carrying a series of revolving bit-spindles, and an intermittent traveler provided with a series of clutches, adjustable grooved plates pivotally connected to the traveler-guides and designed to engage depending pins on lateral extensions of the clutches, and a cam-head connected to a bed-plate on the main frame and adapted to engage an arm of each clutch as the traveler is rotated, whereby said clutches are partially rotated, said cam-head being capable of pivotal adjustment, substantially as set forth.

6. The main frame having journaled thereto a drive-shaft that carries a system of belt-pulleys, an intermittingly-operated sliding frame carrying a series of revolving bit-spindles, an intermittent traveler provided with a series of clutches, and a reciprocating longitudinal bar having right-angular upwardly-extended ends designed to open said clutches at the feed and delivery ends of the machine, substantially as set forth.

7. The main frame having journaled thereto a drive-shaft that carries a system of belt-pulleys, an intermittingly-operated sliding frame carrying a series of revolving bit-spindles, an intermittent traveler provided with a series of pivoted plates, pivotally-united clutch-arms trunnioned to the plates, and a depending guide-rod for the clutches, extended from end to end of the machine in line with said traveler, substantially as set forth.

8. The main frame having journaled thereto a drive-shaft that carries a system of belt-pulleys, a sliding frame intermittently operative on the main one and carrying longitudinally-adjustable bearings, a series of revolving and longitudinally-adjustable bit-spindles provided with horizontally-adjustable shafts journaled in said bearings, and an endless intermittingly-actuated traveler provided with a series of pivoted clutches and arranged at right angles to the sliding frame, substantially as set forth.

In testimony that I claim the foregoing I have hereunto set my hand, at Hudson, in the county of St. Croix and State of Wisconsin, in the presence of two witnesses.

JOHN M. NASH.

Witnesses:
JAMES A. FREAR,
P. Q. BAYDEN.